United States Patent Office 3,130,358
Patented Apr. 21, 1964

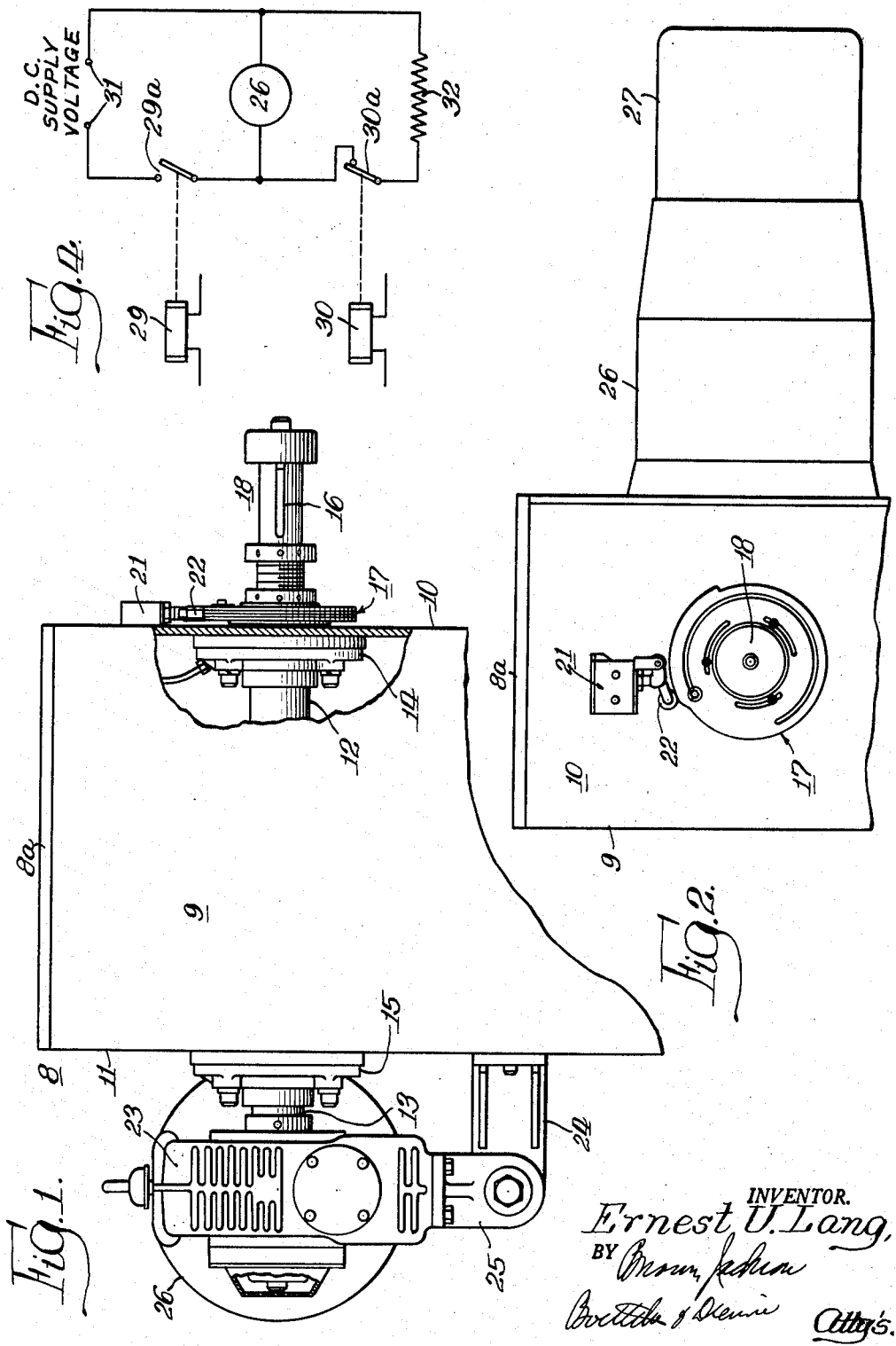

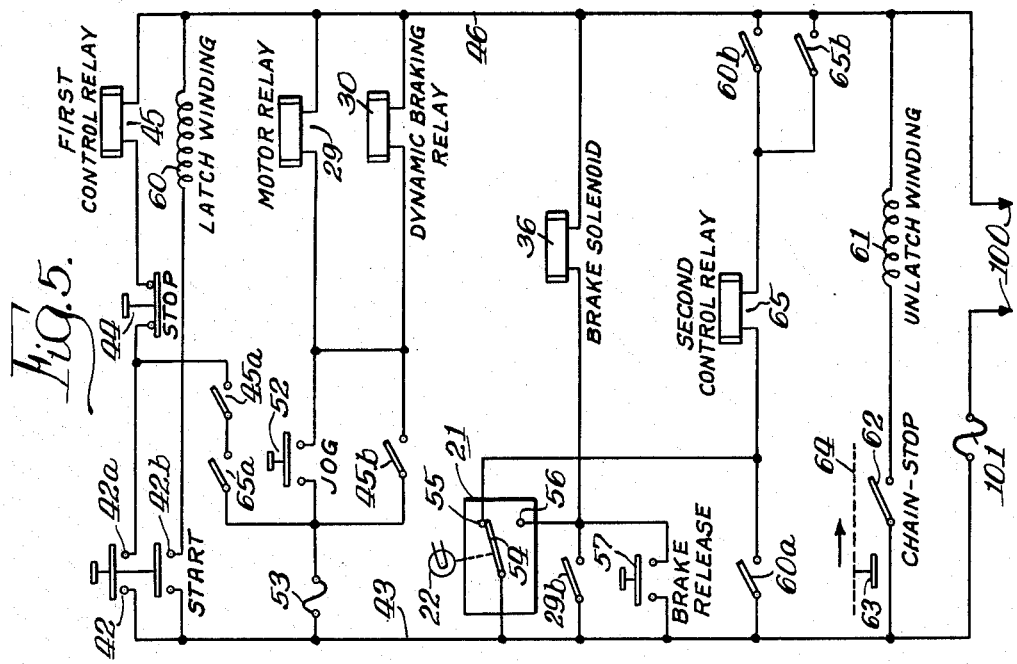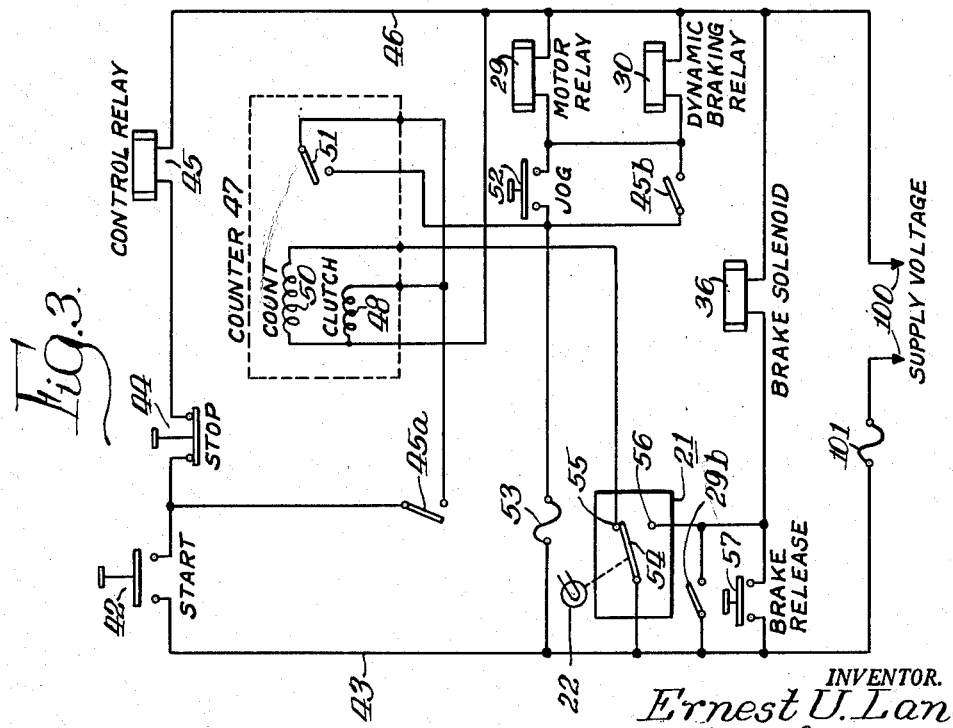

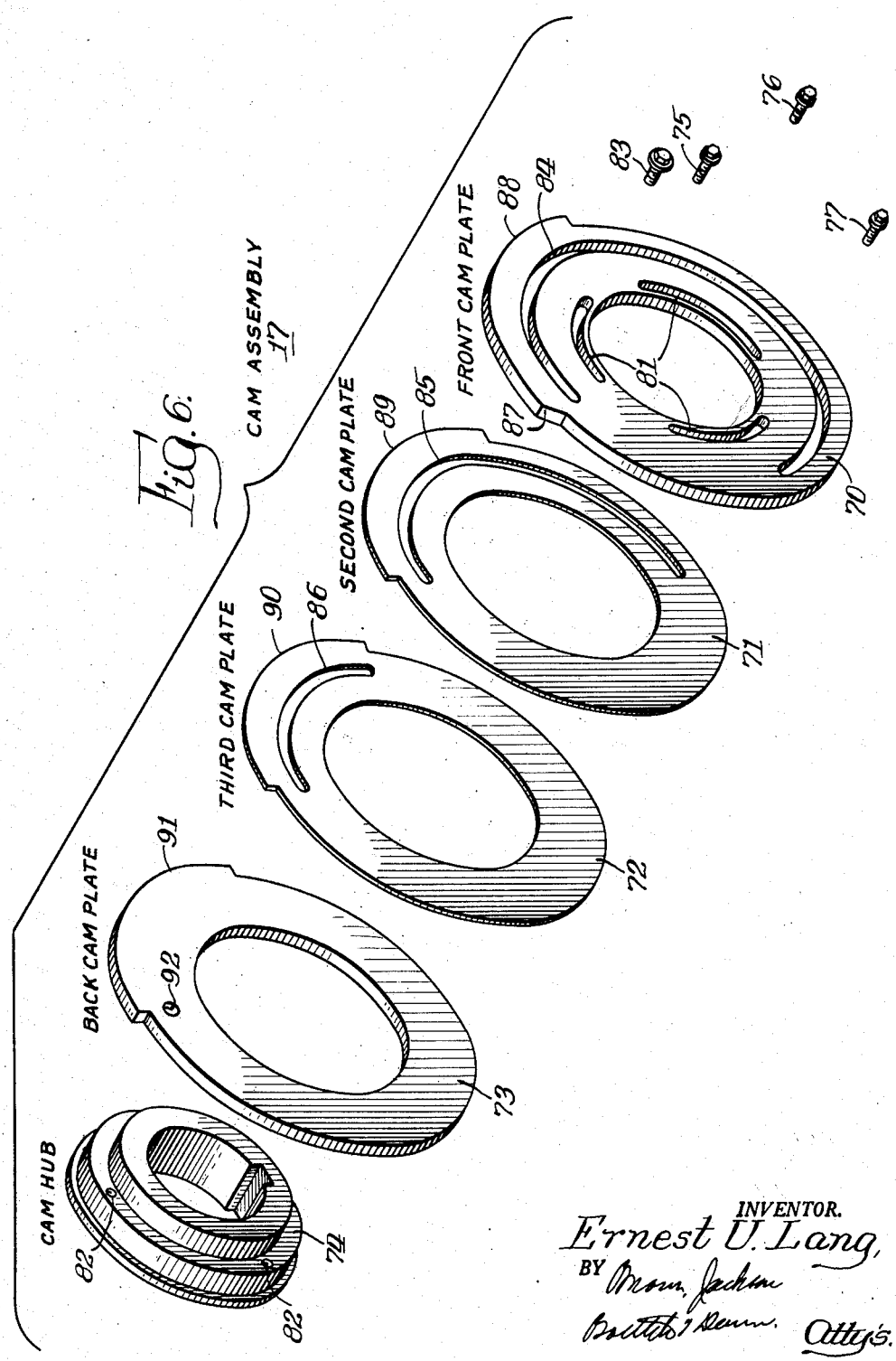

3,130,358
D.C. MOTOR FOR POSITION CONTROL WITH DYNAMIC AND MECHANICAL BRAKING
Ernest U. Lang, Niles, Mich., assignor to National-Standard Company, Niles, Mich., a corporation of Delaware
Filed Jan. 25, 1960, Ser. No. 4,250
2 Claims. (Cl. 318—371)

This invention is directed to means for braking a rotating shaft to a stop at a predetermined angular position of rotation, and more particularly to means for accurately stopping a rotating shaft having a large momentum at a preselected angular position of rotation after a predetermined number of revolutions.

In the fabrication of rubber tires for automobiles, trucks, aircraft, etc., it is desirable to reinforce the innermost portion of the tire which fits adjacent the rim, and this reinforced section is termed a "bead." The production technique for fabricating a reinforced bead is now well known and understood in the art. In brief, an extrusion head is fed both with a rubber material and with a continuous wire which is pulled off a supply drum against the retarding force of a let-off apparatus. The wire is coated with a rubber sheath in the extrusion head, whence it is pulled by a motor-driven haul-off drum. The rubber-sheathed wire is then led over a festoon, including both an upper and a lower set of sheaves, and from the festoon to a motor-driven winder. The bead is built on a former positioned on the winder shaft, and the lower set of sheaves in the festoon is movable to permit more or less bead material to be stored thereon as the speed of the winder is varied during the bead-building cycle. The winder is started and rotated through several revolutions, depending on the desired size and strength of the finished bead, and then stopped precisely at a preselected angular position of rotation where the sheathed wire is severed from the finished bead and the bead is removed from the former. Automatic means for seizing the severed rubber-sheathed wire preparatory to laying it upon the former to start the next bead are provided; manifestly proper operation of such automatic means requires that the winder rotation be halted with high precision at a preselected angular position of rotation at the termination of each successive operation.

The time during which the winder is driven to shape the bead thereon can be very brief, and three seconds is not uncommon for this cycle. During this short interval the winder attains a high velocity, so that bead material is pulled from the festoon at the rate of, by way of example, 1,000 feet per minute. It is therefore manifest that the problem of accurately stopping a heavy winder machine rotating at such a velocity is complex, and becomes further complicated when it is remembered that the winder must stop at exactly the same position at the end of each cycle. Even a lightweight winder attains a substantial momentum when rotated at a high velocity, and if this large momentum is braked only by mechanical means, it is difficult to stop the winder at a preselected rotational position, and further the mechanical braking device is rapidly worn out. Dynamic braking of the winder has been utilized in conjunction with such apparatus, but has not proved sufficiently accurate in stopping the equipment at the desired location.

It is therefore an object of the present invention to provide a novel method of and apparatus for accurately braking a shaft which is rotating with a high momentum so that the shaft is stopped at a preselected rotational position, and to consistently perform such braking in a positive manner after a number of rotations which may be preset on the equipment.

The foregoing and other objects of the invention are attained by utilizing a combination of dynamic and mechanical braking members governed by control means for initially applying dynamic braking to a rotating body to substantially reduce its momentum, and thereafter applying mechanical braking to the body to effect a complete and positive stopping of the shaft at such preselected rotational position.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

FIGURES 1 and 2 are partial side and front views, respectively, of a portion of a winder in which the invention finds utility;

FIGURE 3 is a schematic diagram of a control circuit for effecting winder operation in accordance with the inventive teaching;

FIGURE 4 is a schematic diagram of winder propulsion means and dynamic braking means for control by the circuit of FIGURE 3;

FIGURE 5 is a schematic diagram of another control circuit for regulating the equipment shown in FIGURE 4; and FIGURE 6 is an exploded perspective view illustrating several elements of a cam assembly useful in connection with the invention.

In FIGURE 1 a portion of a winder 8 is illustrated. The winder includes a main housing 8a having an end wall 9, and front and rear walls 10 and 11, respectively. A portion of end wall 9 is cut away to show a housing 12 for main winder shaft 13 having a driven end journalled in a bearing 14, and a driving end journalled in a similar bearing 15. Bearing 14 is fixedly attached to and supported by front wall 10 of housing 8a by bolt means or the like, and bearing 15 is likewise fixedly attached to and supported by back wall 11 of the main housing. A cam assembly 17 is affixed to shaft 13 adjacent and externally of front wall 10 of housing 8a, as shown in FIGURE 1. Cam assembly 17 includes a plurality of camming plates rotationally adjustable with respect to each other to provide a lobe or upper camming surface and a lower camming surface of a variable circumferential length, as will be explained more fully hereinafter. A hub element 18 includes a slotted keyway 16 and is affixed to the driven end of shaft 13. Hub 18 is adapted to receive former drums (not illustrated) of various sizes, depending upon the size and strength of the bead desired to be formed during any particular operation, which drums include a key extension for engagement with keyway 16.

Also shown in FIGURE 1 is a cam follower and switching assembly 21, which includes a cam follower element shown as a roller 22 which rides on the high camming lobe and lower camming surface of assembly 17. The juxtaposition of the cam follower assembly with respect to the cam assembly itself will be illustrated and explained in connection with FIGURES 2 and 6 hereinafter.

The driving end of shaft 13 is connected to a gear (not shown) within gear box or speed reducer 23, supported on winder shaft 13. A bracket 24 is bolted to rear wall 11 of the housing, and also connected to torque arm 25 which is attached to speed reducer 23; bracket 24 serves as a reaction point for torque arm 25. Coupled to the other end of the gear train within gear box 23 is a driving motor 26. Only the outermost portion of the motor housing is visible in FIGURE 1, and this motor may be furnished as a unit with speed reducer 23 and a mechanical brake, such as a conventional disc brake. Such motorreducer-brake assemblies are well known and commercially available. As will be made clear hereinafter, dynamic braking is also provided for motor 26 in a manner now well known and understood in the art. Those skilled in the art will also recognize the ratio within gear box 23 is such as to effectively multiply the propulsion effect of motor 26, and to likewise amplify both the mechanical and the dynamic braking effects.

In the front view of FIGURE 2 the juxtaposition of cam assembly 17, as well as the follower 22 of the cam follower and switching assembly 21, is more readily apparent. Also shown is the housing of a mechanical brake 27, which may be a conventional disc brake having spring bias means normally placing the brake "on" to lock the shaft of motor 26 against rotation, and solenoid means effective when energized to oppose and overcome such bias force, thus permitting free rotation of the shaft. The relation of such mechanical braking to the dynamic braking will be explained in detail in connection with the control circuits of FIGURES 3 and 5.

The control circuit shown schematically in FIGURE 3 is energized upon connection of conductors 100 to a source of suitable supply voltage, which may be a conventional 110 volt, 60 cycle source. A fuse 101 is connected in one of the supply lines to prevent damage to the control equipment which might be caused by surges or other transient effects appearing on conductors 100.

The control equipment is basically operative to control motor 26 in driving former shaft 13 through a predetermined number of revolutions for each actuation of a start switch 42, and in the embodiment of FIGURE 3 includes a counter 47 coupled to a set of count contacts in cam follower and switching assembly 21 which are closed by the lobe on cam assembly 17 during each revolution of shaft 13; each such contact closure energizes count winding 50 to tally the count in counter 47. When the last one of a preset number of revolutions commences, the lobe of cam 17 closes count contacts 54, 55 and translates an impulse to count winding 50 to signal counter 47 the preset count has been reached; at this time the equipment is awaiting the command to deenergize motor 26 and apply dynamic braking to the winder shaft. After a first interval determined by the peripheral extent of the lobe on cam assembly 17 cam follower 22 falls off the lobe onto the lower camming surface, in effect issuing the command to disable motor 26 and to instantly apply dynamic braking to the winder shaft. Dynamic braking alone is applied through a second interval regulated by the peripheral length of the lower camming surface of assembly 17, and at the expiration of the second interval mechanical brake 27 is also actuated by deenergization of brake solenoid 36 to stop winder shaft 13 exactly at a preselected rotational position.

The control equipment for effecting such manner of operation is shown in FIGURE 3 prior to initiation of a complete cycle of operation by closure of a start switch 42. The control elements are in their inoperative positions, and cam follower or roller 22 of the cam follower and switching assembly 21 is riding on the lobe of assembly 17 as shown in FIGURE 2.

With respect to such figure, the control circuit includes a normally open start switch 42 and a stop switch 44 which are connected in series circuit with a control relay 45 across supply conductors 43 and 46, and in the closed position switch 42 completes an energizing circuit for control relay 45. The control relay includes a first pair of contacts 45a and a second pair 45b, each of which is closed responsive to actuation of control relay 45. Contacts 45a are connected in series with start switch 42 to control an obvious energizing circuit for a clutch winding 48 in a counter 47, and contacts 45b are connected in an obvious energizing circuit for motor relay 29 and dynamic braking relay 30, the circuit extending from source conductor 43, over overload fuse 53, contacts 45b and relays 29 and 30 to second source conductor 46. Relay 29 in its operation closes contacts 29a, as shown in FIGURE 4, to energize motor 26 from D.C. supply voltage contacts 31, and operation of dynamic braking relay 30 opens its associated contact set 30a to disconnect dynamic braking resistance 32 from motor 26.

Clutch winding 48 in counter 47 as energized controls the closure of contacts 51, which are then maintained in the closed position as count winding 50 is subsequently energized and deenergized during each revolution of the winder shaft to register the count in counter 47. When the last revolution commences count contacts 54, 55 are closed as cam follower 22 is raised by the lobe of cam assembly 17 to energize count winding 50 to notify counter 47 the last revolution has commenced; as cam follower 22 subsequently falls off the lobe in the last revolution, count contacts 54, 55 are opened to deenergize count winding 50 and simultaneously open contacts 51. One counter commercially available and suitable for use in this portion of the inventive control system is the "HZ" Series "Microflex" Reset Counter of the Eagle Signal Corporation, Moline, Illinois.

Motor relay 29 also controls another set of motor contacts 29b, which contacts close with energization of relay 29 and motor 26 to complete an obvious energizing circuit for mechanical brake solenoid 36 to thereby maintain mechanical brake 27 in the off position for the period in which motor 26 is energized. Dynamic braking is applied immediately to the motor shaft without any further electrical making or breaking operations as contacts 29a are opened and 30a are closed, responsive to the interruption of the energizing circuits for motor relay 29 and dynamic braking relay 30, such as by opening contacts 45b.

Cam follower 22 of assembly 21 is arranged to drive switch arm 54 between contacts 55 and 56, as follower 22 rides on the upper and lower camming surfaces, respectively, of cam assembly 17 as the former shaft is rotated by motor 26. The repeated engagement of count contacts 54, 55 intermittently energizes count winding 50, and only after the preset count is reached is deenergization of count winding 50 effective to open contacts 51. The intermittent energization of brake contacts 54, 56 produces no effect so long as contacts 29b are maintained closed by the motor relay to energize solenoid 36.

In operation, closure of start switch 42 to initiate one cycle of the equipment completes an energizing circuit to control relay 45 which in turn closes contacts 45a and 45b, to complete an energizing circuit for clutch winding 48 and relays 29 and 30. Clutch winding 48 operates and at its associated armature (not shown) closes contacts 51, thereby completing an obvious holding circuit for control relay 45 from source conductor 43 over fuse 53, contacts 51, 45a, stop switch 44, and relay 45 to source conductor 46, to maintain the control system energized independently of and after the release of start switch 42. Motor relay 29 operates, closing contacts 29a and 29b. Contacts 29a close and motor 26 operates; contacts 29b close to energize brake solenoid 36 which operates and places the mechanical brake in the off position to permit rotation of former shaft 13. With each rotation of shaft 13, roller 22 passes over the lobe of cam assembly 17, displacing switch arm 54 between contacts 55 and 56.

As explained hereinbefore, this actuation of switch arm 54 is effective to periodically energize count winding 50 and register the number of rotations, until the number preset in the mechanism of counter 47 is reached. Upon the commencement of the last cycle of rotation, contacts 54, 55 close and count winding 50 is operated. The equipment is now prepared to effect the interruption of the motor energizing circuit and the application of dynamic braking to the motor.

More specifically, as the shaft rotates to move the lobe surface out of registration with cam follower 22 contacts 54, 55 are opened and the energizing circuit for count winding 50 is interrupted. The count winding 50 as deenergized in the last revolution of the shaft controls the opening of contacts 51 to thereby open the holding circuit for control relay 45 which restores and at its contacts 45b interrupts the energizing circuits for relays 29 and 30; relay 29 restores and at its contacts 29a interrupts the energizing circuit for motor 26. Simultaneously with interruption of the energizing circuit for motor 26 relay 30 restores to close contacts 30a to connect resistor 32 in parallel with motor 26; thus the dynamic braking action is enabled. As the cam follower 22 opens count contacts 54, 55 to interrupt the holding circuit for count winding 50 and thereby initiate dynamic braking, brake contacts 54, 56 are closed to maintain brake solenoid 36 energized over a circuit which extends from source conductor 43 over contacts 54, 56 and solenoid 36 to source conductor 46.

Thus, even though contacts 29b have opened responsive to deenergization of motor relay 29, the mechanical braking will not be applied to the shaft at this time. The dynamic braking means are operative alone at this time to apply braking force to the shaft and to diminish the angular velocity thereof, thereby substantially reducing the momentum of the winder.

The shaft continues to rotate until cam follower 22 is again in engagement with the lobe or raised portion of assembly 17, and raises switch 54 upwardly away from contact 56, thereby deenergizing solenoid 36 and instantly applying mechanical braking to the shaft in addition to the dynamic braking. This application of mechanical braking, after the winder shaft has had its momentum greatly reduced by the initial application of dynamic braking for an interval determined by the circumferential length of the lower camming surface of assembly 17, permits the mechanical braking to produce accurate and positive stopping of the winder at a preselected rotational position. As shown hereinafter, such interval is readily adjusted to different lengths by varying the circumferential lengths of the lobe and of the lower camming surface of cam assembly 17.

The control circuit illustrated in FIGURE 3 is useful to regulate the operation of a winder commercially known as a "Universal" type bead winder, which is available from the assignee of the present invention. Because any desired count can be set on the apparatus of counter 47, and thus a bead of any desired number of convolutions can be formed, it is evident that a very flexible and accurate operation is possible with the control means of the present invention.

In the event that slight manual displacement of the winder shaft is desired, in particular during adjustment of the apparatus, brake release switch 57 may be closed to energize brake solenoid 36 and release the mechanical brake. Jog switch 52 is also provided to afford manual control of relay 29 and motor 26, to further facilitate adjustment of the equipment.

Other bead forming structures are available from the assignee of this invention, including a particular apparatus for shaping a hexagonal bead as disclosed and claimed in applicant's copending application having Serial No. 775,750, now Patent No. 3,061,236, filed November 24, 1958, and entitled "Bead Building Apparatus." In that application a particular control means for insuring a predetermined traverse of the reinforced rubber-sheathed wire back and forth across the former is set forth. The traverse mechanism is controlled by the physical placement of protruding lugs on a chain which is driven in coordination with the revolutions of the shaft, and one lug is positioned to trip an "off" switch at the end of the bead forming cycle. Such control of the end of the cycle could replace that of counter 47 shown in FIGURE 3, and a control circuit suitable for use with the bead builder of the above-identified application is set forth in FIGURE 5.

The control circuit there shown is similar to that of FIGURE 3. Start switch 42 of FIGURE 3 has been replaced in FIGURE 5 by one which includes two contact sets, 42a and 42b. Contact set 42a is connected so that, when the start button is depressed, an energizing circuit is completed for first control relay 45, and contact set 42b completes an energizing circuit for a latch winding 60 which operates a set of contacts 60a and 60b in the control of a second control relay 65, which in turn controls associated contact sets 65a and 65b. An unlatch winding 61 is connected in series with a chain-stop switch 62, which is closed when stop lug 63 on chain drive 64 engages the movable one of contacts 62, energization of unlatch winding 61 effecting the opening of contacts 60a and 60b in the control circuit for relay 65 for a purpose to be described more fully hereinafter.

The operation of the circuit of FIGURE 5 is similar to that of the circuit shown in FIGURE 3 each being initiated by actuation of a start switch 42. The control circuit of FIGURE 3, however, automatically halts the rotation of the winder shaft after a certain number of revolutions as determined by the setting on counter 47. In the circuit of FIGURE 5, the winder shaft is stopped when a protruding lug 63 strikes the movable arm of contacts 62 to thus effect closure thereof and energization of unlatch winding 61.

As shown in FIGURE 5, pressing of the start button completes an energizing circuit for control relay 45 which operates and at its contacts 45b completes an energizing circuit for motor relay 29 and dynamic braking relay 30 which extends from first source conductor 43 over fuse 53, contacts 45b, and relays 29 and 30 to second source conductor 46. The energizing circuit and dynamic braking circuit for motor 26, shown in FIGURE 4, are controlled by relays 29 and 30 as explained above. Contacts 42b complete an obvious energizing circuit for latch winding 60.

Latch winding 60 operates its associated armature to close contacts 60a and 60b, thus effecting energization of second control relay 65. Relay 65 operates and at its contacts 65a completes a holding circuit for control relay 45 extending from source conductor 43, over fuse 53, contacts 65a, 45a, stop switch 44, and control relay 45 to source conductor 46, and at its contacts 65b completes a self holding circuit which extends from source conductor 43 over contacts 60a, relay 65, and contacts 65b to second source conductor 46. Thus control relay 45 is maintained energized even after start switch 42 is released. Although such release is effective to deenergize latch winding 60, contacts 60a and 60b remain in the closed position until unlatch winding 61 is subsequently energized.

It is apparent that the continued rotation of the winder shaft and the alternate raising and lowering of cam follower 22 as cam assembly 17 is rotated, and its concomitant displacement of movable switch arm 54 between contacts 55 and 56, does not affect the control circuit of FIGURE 5 until unlatch winding 61 is energized. When lug 63 engages chain-stop contacts 62 and effects their closure, unlatch winding 61 is energized and the automatic and precise stopping of the winder shaft is initiated. The lug is positioned on the chain so that contacts 62 will be closed during a time when roller 22 is riding on the lobe or high camming surface of cam assembly 17. When contacts 62 close, unlatch winding 61 is energized and contacts 60a and 60b are opened, but second control relay 65 remains energized over a circuit including contacts 54 and 55 and holding contacts 65b. At this time the circuit has prepared the equipment for the dynamic braking operation.

When cam assembly 17 rotates farther to permit roller 22 to drop to the lower surface of the cam assembly, switch cam 54 leaves contact 55, thus opening the energizing circuit for second control relay 65 which restores to open contacts 65a and 65b. The opening of contacts 65a interrupts the holding circuit for first control relay 45 which restores and at its contacts 45b interrupts the energizing circuits for relays 29 and 30, whereby the motor is deenergized and dynamic braking action is instantly effected as explained hereinbefore. Although motor relay contacts 29b are opened at this time, roller 22 is riding on the lower portion of cam assembly 17 and brake solenoid 36 is maintained energized over contacts 54 and 56. The mechanical brake is thus prevented from taking effect at this time, and the dynamic braking action alone effects a substantial reduction of the winder momentum while roller 22 rides on the lower caming surface of cam assembly 17. When the cam assembly rotates sufficiently to raise roller 22, switch arm 54 is displaced upwardly away from contact 56, breaking the energizing circuit for solenoid 36 which restores to additionally apply the mechanical braking action to effect a positive and accurate stopping of the former shaft at the preselected rotational position. Thus, whether the former is set to be controlled by a counter to stop after a predetermined number of revolutions, or by a stop on a chain drive, the sequence of the application of dynamic and mechanical braking to effect the accurate stopping of the former shaft at a predetermined angular position is the same.

In each stopping cycle, dynamic braking is first applied to the shaft and subsequently, after the shaft has been considerably slowed and its momentum substantially reduced, mechanical braking is also applied to positively and accurately halt rotation at a preselected rotational location. To run the bead material at higher speeds, or utilize machinery with considerably more inertia, it is desirable to increase the duration of the period between application of dynamic braking and mechanical braking. Manifestly the less the inertia when mechanical braking is applied, the less the wear on the brakes, and hence the longer the period that the mechanical brake will function with the desired accuracy. To facilitate the rapid and simple adjustment of cam assembly 17 for operation in these different environments, the cam assembly is comprised of five different elements.

As shown in FIGURE 6, cam assembly 17 includes a front cam plate 70, a second cam plate 71, a third cam plate 72, a back cam plate 73, and a cam hub 74. When assembled, elements 70–74 are secured together by three screws 75–77 which pass through inner indexing apertures 81 of front cam plate 70, through the interior portions of cam plates 71–73, and are secured in tapped holes 82 in cam hub 74. After screws 75–77 are tightened, there is a slight axial clearance in the assembly to permit relative rotation of the cam plates.

Another screw 83 serves as an indexing and locking member, and in the assembled position passes through the 270° indexing slot 84 in front cam plate 70, through the 180° indexing slot 85 in the second cam plate, through a 90° indexing slot 86 formed in the third cam plate, and is secured in tapped hole 92 in back cam plate 73 to lock the cam elements against relative rotation. In the embodiment illustrated, each of inner indexing slots 81 in front cam plate 70 extends about 75°, to permit rotation of the front cam plate (when screws 75–77 are loosened) to position ramp portion 87 of raised section 88 at a desired location. Manifestly raised portion 91 of the back cam plate can be rotated through 270°, while raised portion 90 of the third cam plate is rotated through 180° and raised portion 89 of the second cam plate is rotated only 90° as screw 83 is loosened and moved through the 270° slot 84 of the front cam plate. Thus, a nearly continuous lobe on cam 17 may be formed.

Accordingly, to alter the duration of the period between application of dynamic braking and application of mechanical braking, screw 83 is loosened and the cam elements "fanned" or rotationally displaced with respect to each other to produce the desired proportion of high and low camming surfaces on the circumference of the cam assembly, and the screw is then tightened. Care must be exercised to avoid slight displacement of the cam elements from their desired positions, caused by friction with each other, as screw 83 is loosened and tightened. In this way the effective lengths of the lobe and of the lower camming surface are altered and the period during which only dynamic braking is applied is readily and positively altered in a simple, speedy operation.

It has been found that a shaft rotating at a high speed, or with a high inertia, can be accurately stopped at a predetermined rotational position without excessive wear of the mechanical brake by utilizing the teaching of the invention, in which dynamic braking is first applied for a preselected adjustable period, and mechanical braking is then applied to effect the accurate stopping. The duration of the dynamic braking period is readily controlled, in the illustrated embodiment, by adjustment of the rotational positions of the elements which make up the cam plate assembly. Timing devices other than an adjustable cam assembly will doubtless be apparent to those skilled in the art.

"Dynamic braking," as used in the appended claims, refers to electrical or electromagnetic braking as opposed to mechanical braking. Thus "dynamic braking" includes not only the connection of a resistance across a motor to dissipate energy provided when the motor functions as a generator, as shown in FIGURE 4, but also "regenerative braking" in which the D.C. motor functions as a generator to feed power into the generator (then acting as a motor) of a motor-generator set, "plugging" or reversal of the energizing connections for the motor, and related and analagous braking systems.

Although particular embodiments of the invention have been shown and described, it is apparent that modifications and alterations may be made, and it is intended in the appended claims to cover all such modifications and alterations as may fall within the true spirit and scope of the invention.

What is claimed is:

1. A control arrangement for a machine of the class described having a drive motor and a rotatable shaft to effect rotation of the shaft a predetermined number of revolutions in one direction and for stopping the shaft in a preselected rotational end and start position in the last revolution of said predetermined number of revolutions comprising, dynamic braking means positioned to selectively apply a retarding force to said shaft to substantially reduce to momentum thereof, mechanical braking means positioned to selectively apply a stopping force to said shaft, and a control system comprising circuit means affording electrical circuits for effecting actuation of said drive motor, said dynamic braking means and said mechanical braking means, means for adjusting the predetermined number of revolutions of said shaft, means operative during said last revolution of said shaft to interrupt the circuit for said driving motor and to control said circuit of said dynamic braking means to apply the same and reduce the momentum of said shaft, and said last named means including means to control said circuit of said mechanical braking means to apply the latter and brake said shaft during said last revolution thereof after the expiration of a predetermined interval following the application of said dynamic braking means to said shaft to thereby stop said shaft at said preselected rotational end and start position, and means to close said circuit for said driving motor and to control said circuits of and release said dynamic braking means and said mechanical braking means to provide for ffeecting rotation of said shaft in said one direction from said end and start position.

2. A control arrangement for a machine of the class described having a drive motor and a rotatable shaft to effect rotation of the shaft a predetermined number of revolutions in one direction and for stopping the shaft in a preselected rotational end and start position in the last revolution of said predetermined number of revolutions comprising, dynamic braking means positioned to selectively apply a retarding force to said shaft to substantially reduce the momentum thereof, mechanical braking means positioned to selectively apply a stopping force to said shaft, and a control system comprising circuit means affording electrical circuits for effecting actuation of said drive motor, said dynamic braking means and said mechanical braking means, means for adjusting the predetermined number of revolutions of said shaft, means operative during said last revolution of said shaft to interrupt the circuit for said driving motor and to control said circuit of said dynamic braking means to apply the same and reduce the momentum of said shaft, and said last named means including means to control said circuit of said mechanical braking means to apply the latter and brake said shaft during said last revolution thereof after the expiration of a predetermined interval following the application of said dynamic braking means to said shaft to thereby stop said shaft at said preselected rotational end and start position, means for adjusting the duration of said predetermined interval of application of said mechanical brake means after application of said dynamic brake means, and means to close said circuit for said driving motor and to control said circuits of and release said dynamic braking means and said mechanical braking means to provide for effecting rotation of said shaft in said one direction from said end and start position.

References Cited in the file of this patent

UNITED STATES PATENTS

| | | |
|---|---|---|
| 2,216,318 | Lewis | Oct. 1, 1940 |
| 2,308,963 | Davis et al. | Jan. 19, 1943 |
| 2,537,427 | Seid et al. | Jan. 9, 1951 |
| 2,804,585 | Billante et al. | Aug. 27, 1957 |
| 2,812,484 | De Westfelt | Nov. 5, 1957 |